United States Patent [19]

Lange

[11] 4,142,102
[45] Feb. 27, 1979

[54] ENERGY INDEPENDENT UNIFORMITY IMPROVEMENT FOR GAMMA CAMERA SYSTEMS

[75] Inventor: Kai Lange, Vedbaek, Denmark

[73] Assignee: General Electric Company, Milwaukee, Wis.

[21] Appl. No.: 807,864

[22] Filed: Jun. 20, 1977

[51] Int. Cl.² .............................................. G01T 1/20
[52] U.S. Cl. .................... 250/369; 250/363 S
[58] Field of Search ............................ 250/363 S, 369

[56] References Cited

U.S. PATENT DOCUMENTS 4,071,762  1/1978  Lange et al. ................. 250/363 S Primary Examiner—Davis L. Willis
Attorney, Agent, or Firm—Ralph G. Hohenfeldt

[57] ABSTRACT

In a gamma camera system having an array of photomultiplier tubes for detecting scintillation events and preamplifiers connecting each tube to a weighting resistor matrix for determining the position coordinates of the events, means are provided for summing the signals from all photomultipliers to obtain the total energy of each event. In one embodiment, at least two different percentages of the summed voltage are developed and used to change the gain of the preamplifiers as a function of total energy when energies exceed specific levels to thereby obtain more accurate correspondence between the true coordinates of the event and its coordinates in a display.

9 Claims, 6 Drawing Figures

ENERGY INDEPENDENT UNIFORMITY IMPROVEMENT FOR GAMMA CAMERA SYSTEMS

BACKGROUND OF THE INVENTION

This invention relates to scintillation cameras which are commonly called gamma cameras. The invention is concerned with improving the resolution and uniformity of such cameras.

In nuclear medicine, scintillation cameras are used to detect gamma ray or other high energy photons emitted from a body in which a radioisotope has been infused. The photons are emitted in correspondence with the extent to which the isotope is absorbed by the tissue under examination. The emitted photons are absorbed in a crystalline material and a scintillation occurs at the point of absorption. The points of absorption are substantially congruent with the point from which they are emitted, since the photons are directed to the crystal with a collimator. An array of photomultiplier tubes, generally hexagonally arranged, are optically coupled to the crystal so that each tube will produce an output signal whose magnitude depends on its particular geometrical relationship to the event being detected. Each tube has an x and y coordinate. The signals from each tube are supplied to a resistor weighting matrix which enables computing the x and y coordinates of each event. The x and y coordinate signals are used to drive a cathode ray tube display or other type of display such that an intensity change is made or written at the coordinate point in the display which desirably should correspond with the true coordinates of the scintillation event. Conventionally, the energy of each event is summed and subjected to pulse height analysis. If the total energy falls within the window of the analyzer, a z pulse is produced which unblanks the display to write the light spot or produce some other kind of intensity change. A photographic film may be used as an integrator of the large number of points or spots of light appearing on the screen of the display. A substantial number of scintillation events is required to make up the final picture of radioactivity distribution in the body tissue. The foregoing is an outline of the basic and ideal features of the well-known Anger gamma camera system disclosed in U.S. Pat. No. 3,011,057.

Problems encountered by designers of gamma camera systems are to optimize uniformity and resolution. Due to the geometrical relationship between the various photomultiplier (PM) tubes, when a source of radioactivity having uniform distribution is placed close to the crystal disc and a photograph is made of the display, the photograph will show non-uniformity which is characterized by "hot spots" under each PM tube and "cold spots" between the tubes. In other words, a spot or scintillation event occurring between the PM tubes is sensed as being partially shifted under the tubes, causing a decrease in spot density or intensity between the tubes and an apparent increase in intensity under the tubes. One known way of reducing this undesirable effect is to move the PM tubes further from the disc. This, however, is at the expense of the ability of the camera to resolve small details. Hence, if small details are to be resolved and if uniformity or correspondence between the generated and displayed image patterns is to be maintained, the output signals from the PM tubes must be modified or corrected.

One method of obtaining correction with nonelectronic means is illustrated in U.S. Pat. No. 3,774,032 which is assigned to the assignee of the present invention. In this patent, the distribution of scintillations as detected by the PM tubes is altered by placing masks between the crystal and the tubes so that light from certain areas of the crystal cannot go directly to the PM tubes. This reduces the output of the tubes for scintillations occurring directly uner them but it permits light from other areas, that is, from between the tubes to go directly to them. The result is better, but not optimized, resolution and uniformity in the image.

It has been proposed heretofore to achieve the results obtained in the cited patent by use of electronic correction means. Electronic correction is based on recognition that if the input and output signals of the preamplifiers which are coupled to the PM tubes are linearly related, the disproportionality between brightness and distance remains, but if the output is modified so that low level signals corresponding with noise are eliminated and high level signals corresponding with the scintillation event occurring at or near the center of the tube are suppressed, more uniform distribution of the light spots on the display will be accomplished.

It has been demonstrated in U.S. Pat. No. 3,953,735 that if the output of the preamplifiers is properly biased, high amplitude signals can be clipped or suppressed which is equivalent to reducing the gain of the preamplifiers for signals above a predetermined amplitude. In this scheme, the plot of preamplifier input signals versus preamplifier output signals is linear for a first comparatively low level signal range and it has a break point after which gain is reduced for higher level input signals. This produces some improvement in uniformity and resolution but there was still localized "hot" and "cold" spots which appeared randomly throughout the crystal, varying from system to system and depending on the individual characteristics of the components of the system.

A further substantial improvement was made in pending patent application Ser. No. 731,150, filed Oct. 12, 1976 now U.S. Pat. No. 4,071,762, dated Jan. 31, 1978. This case is based on the recognition that more than one change in slope of the input to output transfer characteristics of the preamplifiers can eliminate the small localized hot and cold spots which still existed when known techniques for eliminating them were employed. Thus, two or more selected bias voltages are applied to the output of selected preamplifiers to improve linearity or uniformity and resolution.

Other schemes have been proposed such as in U.S. Pat. No. 3,980,886 which uses diodes to couple signals from a nonlinear summing circuit as a feedbck signal for linearizing. Another method is shown in U.S. Pat. No. 3,908,128 wherein a diode or other nonlinear compensation means is biased by an ac and dc source so that diodes in the preamplifier output circuits to the resistor matrix will not always conduct at the identical input signal amplitude.

The foregoing schemes produced linearity or uniformity and resolution improvements which are substantially adequate if all of the photons have the same energy. However, even if the photons from a given isotope are monoenergetic, variations in the scintillation process and the detection process cause the electric signals from the PM tubes to vary, thereby causing the coordinates of the events in the display to lack correspondence with the true coordinates of the events.

Thus, it is common practice to normalize the signals which amounts to dividing the coordinate signals by the sum of the energies of each event. Nevertheless, prior linearizing methods are not adequate when more than one isotope having markedly different nominal photon energies are used nor for isotopes which have several different nominal peak energies. For example, radioactive gallium is now being used more frequently for imaging soft tissue tumors or tumors away from the bone. Gallium has three energy peaks and other isotopes have energy peaks which may range between 60 and 450 kilo electron volts. The isotopes most commonly used heretofore generally had an energy range of about 70 to 160 kilo electron volts. On some occasions, more than one isotope is imaged at the same time which makes the prior linearity correction schemes even more inadequate since they can only cope with a small energy spectrum.

SUMMARY OF THE INVENTION

An object of the present invention is to overcome the above noted problems by providing means for correcting for nonlinearity or lack of positional correspondence between a scintillation event and its display which is substantially independent of detected photon energy within a practical range.

A more specific object is to alter the preamplifier output bias point and thereby change the slope of a portion of the plot of the curve representing the normal relationship between the distance of an event from the center of the photomultiplier tubes versus the coordinate representing voltage signals from the tubes.

A still further object is to provide for applying bias voltages to the preamplifier outputs to effect gain changes which will make the aforementioned plot more nearly coincident with the ideal.

A more basic object of this invention is to enable establishing the break point, or the point at which the relationship between the detected voltage signal and the voltage signal that is used for determining the coordinates of a scintillation event changes, as a function of the total energy sensed by all detectors during an event so the non-linear correction may be applied independently of the energies of the photons.

A more general object is to provide a more universally applicable, simple and effective nonlinearity correction means for a gamma camera system.

Briefly stated, the new linearity correction means involves summing the different amplitude voltage signals which are produced by the preamlifiers of all of the PM tubes and using this signal to develop bias voltages which are predetermined percentages of the summed signal. In one embodiment, pairs of transistors are connected to each preamplifier output line. The transistors are nonconductive when the preamplifier output is below a certain point on its gain curve. Whenever the summation of energies of a given scintillation exceeds this level, which level corresponds with a first percentage of the total signal, the first transistor in each pair on each line is turned on to change the gain and the slope of the curve. When the total energy of an event exceeds the next predetermined level, the second transistor is turned on to change the slope again in which case there are two break points in the curve. The system could be arranged for producing more break points at higher and higher energy levels if desired.

After the signals are treated as in the preceding paragraph, they can be used to compute the coordinates of the scintillation event in any one of several conventional ways which are known to those involved in the scintillation camera art.

How the foregoing and other more specific objects of the invention are achieved will appear in the ensuing more detailed description of an illustrative embodiment of the invention in connection with which reference will be made to the drawings.

DESCRIPTION OF A PREFERRED EMBODIMENT

Figure 1:
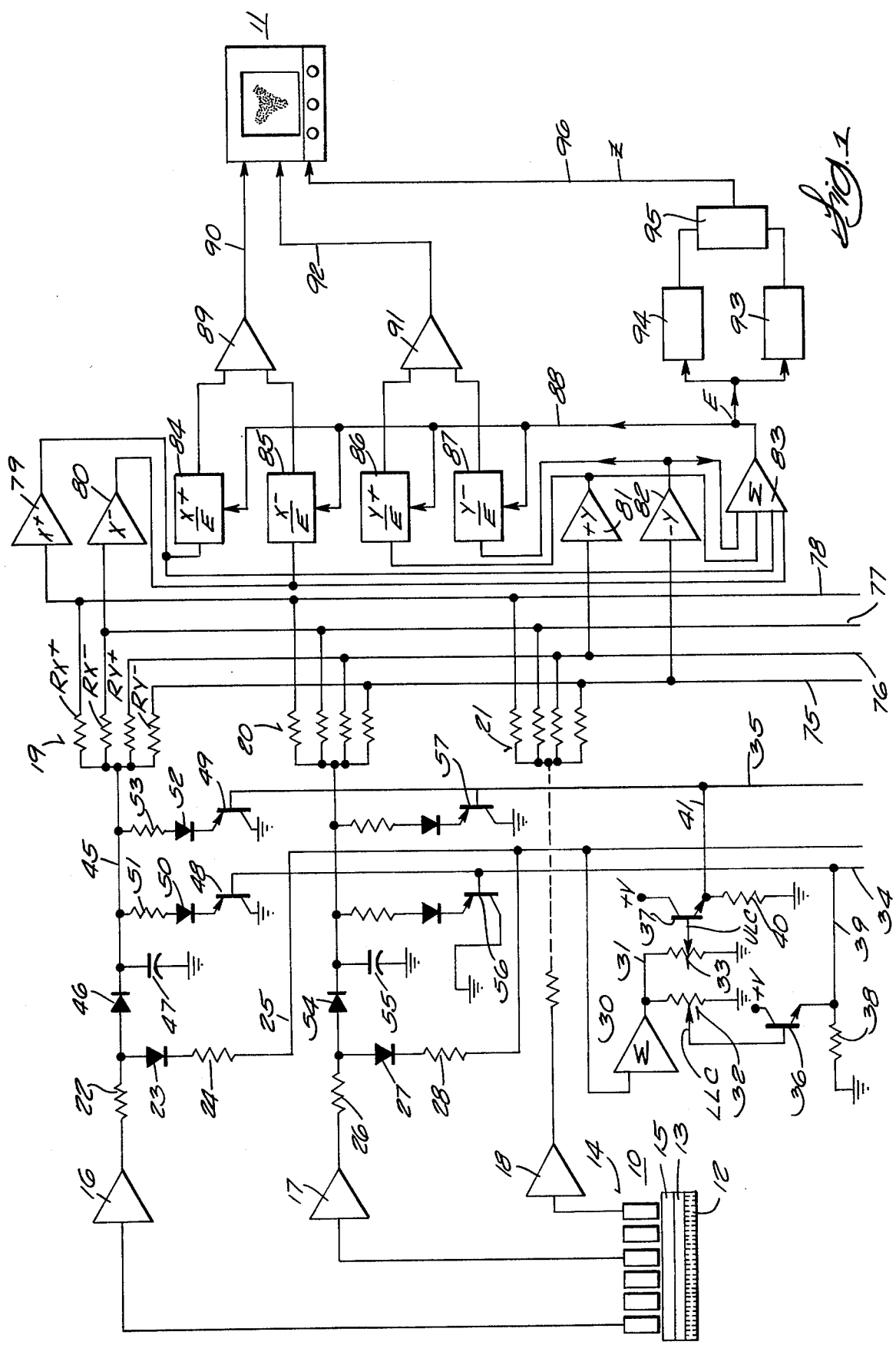
FIG. 1 is a schematic diagram of a gamma camera system embodying the new energy independent linearity correction means wherein the circuitry involving the improvement is shown in detail and conventional parts are shown in block form.

Referring to FIG. 1, at the far left there is a gamma camera which is generally designated by the reference numeral 10 and at the far right there is a monitor 11 on which a radioisotope image may be visually displayed. Considering the camera 10, it is essentially the Anger type comprising a collimator 12 having a plurality of parallel vertical holes for directing photons in straight line paths upwardly from a radiation emitting body, not shown, which would be disposed under the collimator for examination. A large area scintillation crystal 13 is disposed on the output end of the collimator. Photons having sufficient energy which are absorbed by the crystal 13 produce scintillations or light flashes at the point of absorption. The input ends of a plurality of photomultiplier tubes, which are designated collectively by the reference numeral 14, view each scintillation event through a large area optical coupling device which may be a plate of glass 15. The arrangement of PM tubes are viewed from the bottom in FIG. 1 may be seen in FIG. 2. In this example, there is an array of 37 tubes but it will be understood that the new linearity correction means is applicable to systems using as few as 3 tubes, 19 tubes which are commonly used and numbers larger than 37.

Figure 2:
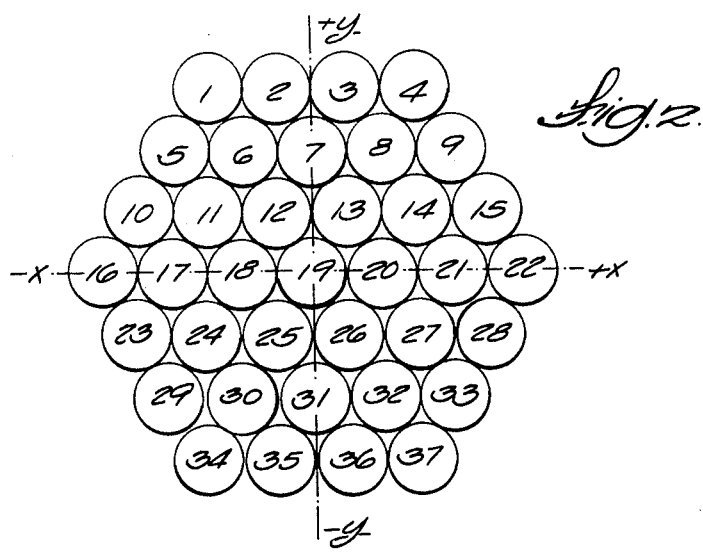
FIG. 2 is a view looking at the input ends of the photomultiplier tubes in a typical, but not exclusive type, arrangement wherein 37 PM tubes are used.

The output of each PM tube is coupled with the input of a preamplifier. In FIG. 1, 3 of the 37 preamplifiers are illustrated and they are marked 16, 17 an 18. Each scintillation event is viewed or detected by each PM tube and the magnitudes of their respective output signals depends on their distance and geometrical relationship with respect to the event and on photon energy. The tubes are arranged on coordiante axes which, in FIG. 2, are marked −x, +x and −y, +y. The location of each PM tube can be identified by its coordinates and so can the scintillations. As is well known, a fundamental object is to display the scintillation events at corresponding coordinates on the screen of the television monitor 11 without distortion, nonlinearity nor nonuniformity.

In the present system, as in some prior systems, the output signals from the 37 preamplifiers are supplied to respective resistor matrices such as the three matrices which are shown and generally designated by the reference numerals 19, 20 and 21. A typical matrix 19 has four weighting resistors which are marked Rx+, Rx−, Ry+ and Ry−. Determination of the values of these resistors need not be explained since it is well understood by those versed in the art. It is sufficient to remark that each PM tube in the array of FIG. 2 is referenced to the middle tube or the intersection of the coordinate axes. Thus, for a scintillation occurring anywhere, the output signals of the individual PM detecting tubes can be weighted according to their distance from the axes by properly chosen resistor values. To give a few examples, the matrix resistors for tube 1 in FIG. 2 in the order of R+, Rx−, Ry+ and Ry− are, in this example, 36.5, 12.1, 9.76 and 14.3 kilohms having a parallel value of 3.54 kilohms. The matrix for tube 37 has the same individual values and parallel value except that Rx+ is now exchanged with Rx− and Ry+ is exchanged with Ry− in reference to tube 1. Tube 34 has the same values as the Rx values for tube 1 but their Ry values are reversed because tube 34 is on the opposite side of the x axis from tube 1. The values for Rx+ and Rx− for tube 31 are 18.2 kilohms and are equal because this tube is on the y axis and the parallel value of these Rx and Ry resistors is 4.55 kilohms. In general terms, the absolute values of the matrix resistors for all tubes in corresponding positions in the respective quadrants are equal. How the signals from the resistor matrices such as 19–21 are used will be discussed in more detail later. First, however, the new nonlinearity correction means will be discussed.

In FIG. 1, the output signals of various magnitudes from the preamplifier such as 16, 17 or 18 are combined for the purposes of the invention. Consider the output signal from preamplifier 16, for example. It passes through a resistor 22 and branches through a circuit including a diode 23 an a resistor 24 and continues to a bus 25. The signal from preamplifier 17 follows a similar circuit through a resistor 26, a diode 27 and a resistor 28 to the same bus 25. In fact, all of the preamplifiers for each tube are connected to bus 25 through circuits having the same element values as resistor 22, diode 23 and resistor 24. In an actual embodiment, resistors equivalent to resistor 22 have values of 0.5 kilohms and resistors equivalent to 24 have values of 7.5 kilohms. These branch circuits to bus 25 permit summing the signals from each preamplifier for each event simultaneously to produce a composite signal that is representative of the total energy of the photon that caused the scintillation. The bus 25 acts as a summing point for the input of a summing amplifier marked 30. The output line 31 has the total energy voltage signal on it.

Two unique biasing or nonlinearity correction signals are developed using the summed or total energy signal on output line 31. This is done with potentiometers 32 and 33 which have their arms marked LLC and ULC to indicate that they are lower level correction and upper level correction, respectively, bias voltage signals. In a particular commercial embodiment of the invention, the LLC signal from potentiometer 32 is set to produce a bias voltage which is about 50% of the peak or summed total energy signal on output line 31. Potentiometer 33 for the ULC is set to produce a bias voltage which is 70% of the peak value of the total energy signal on output line 31. Thus, there are two bias voltage signals for altering the gain of the amplifiers at two steps or break points when the output signals from the amplifiers such as 16 exceed the lower level correction signal, LLC, and the upper level correction signal, ULC, in that order.

The LLC bias signal is fed to a common bus 34 which leads to nonlinear correction devices, soon to be described, associated with each preamplifier output. The upper level correction signal or bias voltage, ULC, is supplied to a common bus 35 for additional nonlinearity correction devices in the output circuitry of each preamplifier as will be described. In order to make sufficient current available for biasing and changing the gain of the preamplifiers without loading summing amplifier 30 excessively, the LLC and ULC signals are used to drive individual emitter-follower transistor amplifiers comprised of transistors 36 and 37, respectively. The amplifier for LLC has an emitter-resistor 38 and a line 39 is used to couple the signals from the emitter-resistor junction to bus 34. Similarly, the ULC amplifier has an emitter-resistor 40 and a line 41 is used to couple the bias voltage signals from the emitter-resistor junction to bus 35.

To recapitulate, the analog output voltage signals from each of the 37 preamplifiers such as 16–18 are summed with amplifier 30 and the result has a substantially single total energy peak value. In this example, a bias voltage signal equal to 50% of the total energy peak is simultaneously applied to bias bus 34 and another signal equaling 70% of total energy peak is simultaneously applied to upper level bias signal bus 35.

How the bias signals are used to change the gain of the preamplifiers will now be described. Since all 37 channels are the same, the description will be given in reference to the channel which includes preamplifier 16 in FIG. 1. A line 45 in which there is a diode 46 connects divider resistor 22 to weighting resistor matrix 19. Any analog signal from preamplifier 16 which exceeds a predetermined noise level will forward bias diode 46 and will be processed by the resistor matrix 19. A little filtration is obtained with a small capacitor 47.

In this example, line 45 has a pair of biasing transistors 48 and 49 connected between it and ground. Typically, transistor 48 is in series with a diode 50 and a divider resistor 51. The base of transistor 48 is connected to lower level bias signal bus 34. The other transistor 49 also has a diode 52 and a divider resistor 53 in series with it. The base of transistor 49 is connected to upper level bias voltage bus 35.

All channels are similarly connected. The channel which includes preamplifier 17, for instance, has output means for the preamplifier including a noise threshold setting diode 54 and filter capacitor 55. It also includes a nonlinear controlling device exemplified by a first switching transistor 56 whose base is connected to bus 34 on which the 50% of total energy peak voltage appears and another nonlinear controlling device exemplified by switching transistor 57 whose base is connected to bus 35 on which the 70% of total energy peak voltage appears.

Considering the channel including preamplifier 16 again, it will be evident that for a range of signal magnitudes which are just sufficient to forward bias diode 46 and those which are just at or under 50% of the peak or summed voltage, processing is normal. That is, the signal simply goes to the matrix 19 without any preamplifier gain modification. However, any signal appearing on line 45 which is greater than 50% of the peak voltage, will overcome the reverse bias on transistor 48 which will then conduct. This effectively changes the gain of the preamplifier since resistors 22 and 51 act as a voltage divider which changes the ratio between the input and output analog signals of the preamplifier.

Figure 4:
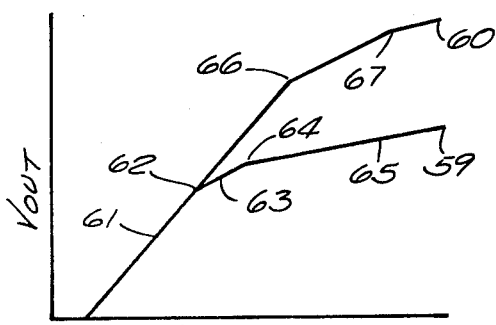
FIG. 4 shows plots of the relationship between signal voltage at the input of the linearity correction means versus voltage out after having been corrected.

What has just been described is illustrated in the FIG. 4 graph of preamplifier output voltage versus input voltage. Two curves 59 and 60 are shown. Each is for isotopes which have substantially different peak energies. Curve 59 for the lower energy is shown as having three segments 61, 63 and 65. The first segment 61 up to break point 62 shows that amplifier gain is linear until the signal magnitude reaches 50% of peak in which case the slope or gain of the curve assumes that of segment 63 after break point 62 where transistor 48 becomes conductive. Note that there is a linear relation between the input and output voltages of the preamplifiers until signals greater than 50% of the total energy for an event come from a preamplifier.

Referring again to FIG. 1, when a signal from preamplifier 16 exceeds 70% of the total energy peak signal, the reverse bias on transistor 49 is overcome and it conducts to change the gain. This break point is marked 64 in FIG. 4. The gain changes by a different amount than for the lower bias signal because resistors 51 and 53 have different values. As can be seen in FIG. 4, the slope of the gain curve changes again after break point 64 as indicated by segment 65. For most applications, two gain changes as heretofore described will be sufficient to obtain the linearity or correspondence between the scintillation event coordinates and the coordinates of the displayed event. If more break points should happen to be needed, of course, further bias voltages would have to be developed and additional transistors such as 48 and 49 and their associated circuitry would have to be used.

The curve 60 in FIG. 4 is for an isotope that has higher energy photons than those which formed the basis of curve 59 or it may be the same isotope with two energy peaks. In any case, the gain will change at break point 66, where the input signal magnitude is 50% of peak and at point 67 where the magnitude is 70% of peak. Note that there is a linear relation between the input and output voltages of the preamplifiers until signals greater than 50% of total energy occur as indicated by break point 66. Although curve 60 relates to higher energy photons than curve 59, it breaks at point 66 or 50% of total energy and point 67 or 70% of total energy while the lower energy curve 59 breaks at point 62 or 50% of total energy and at point 64 or 70% of total energy.

The gain changes at nominally 50% and 70% of peak or total energy signal results in marked improvement in linearity or correspondence in the particular system in which the invention is being used. The percentages may be slightly different in systems of other manufacturers because of a variety of geometric and electronic differences. Specific percentages for other systems cannot be prescribed specifically although it is believed that most known systems will benefit from changing gain at or about 50% and 70% of the peak of the sum of the signals from all PM tubes.

Figure 5:
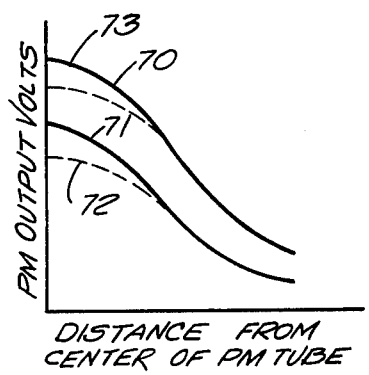
FIG. 5 is a plot for two different photon energy spectrums of photomultiplier tube output voltages versus the distance of events from the center of the tubes where the solid lines are for uncorrected and the dashed lines are for corrected signals.

Some general considerations which were used to determine that bias voltages corresponding with 50% and 70% of peak produced the desirable results will now be discussed in reference to FIG. 5. This is a graph of photomultiplier output voltage versus distance of the scintillation event from the center of the photomultiplier tube. When the energy independent nonuniformity correction procedure described above is not used, the relationship for isotopes having two different photon energy levels or peaks are represented by the solid line curves 70 and 71. If one made a mathematical model of the system and executed a corresponding algorithm with a computer, it could determine the parameter that yields optimum linearity, that is, best correspondence between the location of events and their display, would occur if the distance from the center of the tubes were related to their output voltages in such manner as to suppress the leading parts of the curves so as to take the shape of the dashed lines 72 and 73 at the beginning of the curves. The shape of curves 73-70 and 72-71 is the same and results in their becoming congruent. Anyone desiring to reproduce the invention but does not have the capability for computer analysis, may take 50% and 70% bias voltages as first approximations and, if the results are not optimized, run additional tests with the LLC and ULC potentiometers 32 and 33 adjusted at different levels until optimum results are obtained.

The parts of the system which have not been explained thus far are largely conventional so they will only be discussed briefly. As indicated earlier and as is well known, the analog signals from the weighting resistor matrices such as 19-21 must be normalized to make them independent of energy or the image display on monitor 11 would increase and decrease in size with energy. One way of normalizing is to divide the coordinate signals by the sum of all of them. Thus, the weighted coordinate signals $+x$, $-x$, $+y$ and $-y$ for the 37 matrices from all channels such as 19-21 are placed on common buses 75, 76, 77 and 78. All of the $+x$ coordinate signals are summed in an amplifier 79. All $-x$ signals are summed in an amplifier 80. The $+y$ and $-y$ coordinate signals are similarly summed in amplifiers 81 and 82, respectively. The outputs of amplifiers 79, 80, 81 and 82 are the inputs to a summing amplifier 83. The output of summing amplifier 83 constitutes the algebraic sum of the coordinate signals for any scintillation event. The outputs from summing amplifiers 79-82 are also fed to dividers which are symbolized by the blocks 84-87. The summed signal, called E, is supplied by way of line 88 to each of the dividers wherein division is performed. The divided or normalized x coordinate signals are fed to the inputs of a differential amplifier 89 and the output of this amplifier on line 90 is the signal which establishes the x position of the electron beam in the cathode ray tube display of the monitor for the event. The outputs of the y dividers 86 and 87 are similarly fed to an amplifier 91 on whose output line 92 the signal corresponding with y deflection is transmitted to the deflection circuitry of the monitor. The total energy signal E from amplifier 83 is analyzed by pulse height discriminators 93 and 94. Discriminator 93 determines if the total energy is within one window and discriminator 94 determines if it is within another window. If the energy is within one or the other of the window limits, the discriminators actuate a pulse forming circuit 95 to produce a z pulse on line 96 which unblanks the cathode ray tube beam of monitor 11 and permits a light spot to be written at the coordinates of the event.

Figure 3:
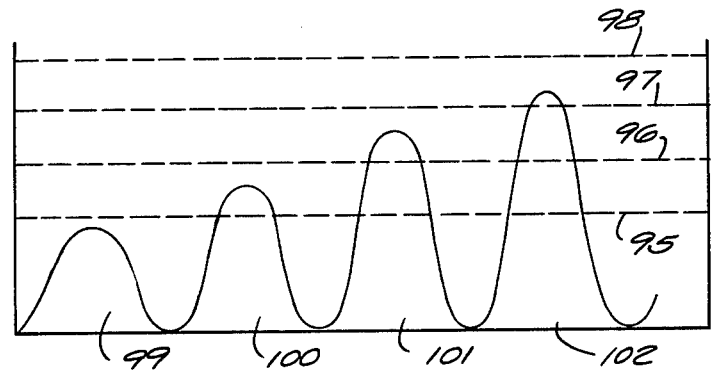
FIG. 3 shows some graphs or plots which are useful for explaining pulse height selection and normalization.

FIG. 3 shows total energy signals of various magnitudes from the output of summing amplifier 83. The lower and upper window limits for discriminator 93 are shown in dashed lines marked 97 and 98 in FIG. 3 and the lower and upper window limits for discriminator 94 are marked 95 and 96. Four different total energies, or E signals, 99–102 are shown. Signal 99 has insufficient magnitude for its peak to fall within window limits 95 and 96 so its occurrence results in no z pulse being formed nor in any light spot being written on the monitor screen. It is rejected by both discriminators. Signal 100 has sufficient total energy to fall within the lower discriminator window limits 95 and 96 so a z pulse is formed coincident with it and a mark is written on the screen of the monitor. Total energy signal 101 does not fall within the window limits of discriminator 92 nor 93 so its occurrence results in no z pulse being formed. Total energy signal 102 has sufficient magnitude for its peak to fall between the lower and upper level limits 97 and 98 of the upper level discriminator 93 in which case a z pulse is formed and a mark is written on the monitor at the coordinates of the scintillation event.

An application of the concept of making a nonlinear correction of preamplifier gain as a function of total detected energy in each scintillation event to another detector scheme will now be described in reference to FIG. 6. This circuit includes some of the elements of a nonlinearity correction means which is typified by FIG. 5 of U.S. Pat. No 3,908,128. Elements which substantially correspond with elements in FIG. 1 of the present application are given corresponding reference numbers except that a prime mark is applied to them.

The cited patent discloses changing the preamplifier gain in each channel whenever the signal from the particular preamplifier exceeds a predetermined dc bias voltage. It further biases the output line with an ac bias voltage that is superimposed on the dc voltage. Thus, one break point is produced in the curve which represents the gain or relationship between the signals from the preamplifier and the corresponding signals which are used to determine the coordinates of the events. The ac bias is used so that the break point, which would otherwise be fixed due to the dc bias, will oscillate at the ac bias frequency to thereby avoid a mottling effect of the field which is said to result from the sharp cutoff of a diode which is used in the bias circuit. The correction means is incapable of correcting properly when the isotope or isotopes emit photons of different energy peaks.

Figure 6:
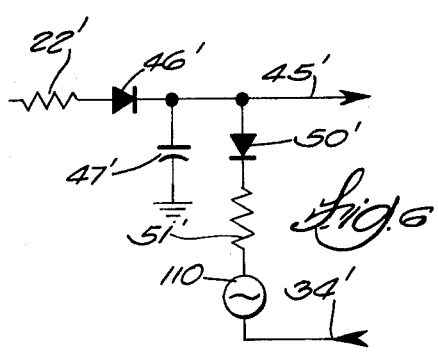
FIG. 6 is an alternate form of detecting circuit to which non-linearity correction based on a percentage of the total detected energy of a scintillation event is used.

In FIG. 6, detected signals, from a PM tube which has been preamplified and has sufficient amplitude to forward bias noise threshold setting diode 46', are conducted from the preamplifier through resistor 22', diode 46' and line 45' to the coordinate signal calculating circuit as usual. Line 45' has a reverse bias voltage applied to it, however, by means of a circuit including diode 50', resistor 51' and an ac bias voltage signal source 110. The ac signal is usually under 0.5 volts. In the prior art, a dc bias voltage source, not shown in FIG. 6, is connected in series with ac bias voltage source 110 as mentioned earlier. If detected signals appear on line 45' that exceed the reverse bias, which is equal to the sum of the fixed dc and instantaneous ac bias voltages, the bias circuit will conduct. This results in the slope change or break point in the gain curve which was previously described and is satisfactory where there is only one peak energy to be dealt with. In other words, a biasing scheme of this type is only useful for single peak energies.

In accordance with the invention, the gain of the preamplifiers or the break in the gain curve is made by shifting the bias point as a function of total detector output energy in FIG. 6 as in the previously discussed embodiment. It is only necessary to add a dc bias which is always a predetermined percentage of total energy. The variable dc bias may be the 50% of peak energy bias voltage obtained from the output of summing amplifier 30 in FIG. 1. Thus, as in FIG. 6, the bias circuits are respectively connected to bus 34' on which the percentage bias voltage appears. Now as the amplitudes of the signals occurring on line 45' change, the total energy will change and the bias point will shift correspondingly because the dc bias is always a predetermined percentage of peak or total energy.

Although the essentials of the new energy independent uniformity improvement features for scintillation cameras have been described in considerable detail, such description is intended to be illustrative rather than limiting, for the invention may be variously embodied and is to be limited only by interpretation of the claims which follow.

I claim:

1. In a radiation imaging system:
   a plurality of detectors for detecting radiant energy emitted by a subject, each of said detectors producing an electric pulse substantially simultaneously in response to each detected radiation event,
   a plurality of preamplifier means for amplifying simultaneously the electric pulses from the respective detector means,
   means for summing said electric pulses from said preamplifier means and for producing a signal representing the total energy of said pulses during each radiation event,
   means responding to said total energy signal by producing bias signals, respectively, corresponding respectively with different predetermined percentages of the said total energy signal so the absolute values of said bias signals vary in correspondence with total energy, and
   output circuit means for the electric pulses from said preamplifier means and including control means controlled respectively by said bias signals to change the gain of said preamplifier means coincident with occurrence of signals from said preamplifier means which have greater magnitudes than a bias signal corresponding with the lower of said percentages of the peak of said total energy signal and to change the gain again coincident with occurrence of signals which have greater magnitudes than a bias signal corresponding with the next higher percentage of said total energy signal.

2. The combination as in claim 1 wherein said output circuit means comprises first resistor means connected to said preamplifier means, said control means comprises a circuit including second resistor means, diode means and transistor means having a control element, said second resistor means being coupled to said first resistor means to form a voltage divider therewith, and means for coupling said bias signals to said respective control elements.

3. The combination as in claim 1 wherein one of said bias signals is about 50% of said total signal peak value and another of said bias signals is about 70% of said total signal peak value.

4. In a system comprising a plurality of detectors for detecting scintillation events resulting from radiation emitted from a subject, each detector producing an electric pulse having a magnitude dependent on its relationship with the event, means responsive to said signals by producing signals corresponding with the coordinates of said events and display means responsive to said coordinate signals by producing an image which is a composite of said events at corresponding coordinates, means for improving the correspondence between the coordinates of the events and their coordinates in said display substantially independently of the energy of the radiation which caused the event comprising:

a plurality of channels each including preamplifier means coupled with the detectors, respectively, for amplifying their said electric pulses simultaneously, means for summing all of said amplified pulses resulting from each event to produce a signal representing the total energy of the pulses, means responding to said total energy signal by producing bias signals corresponding, respectively, with at least two different percentages of the peak value of said total energy signal so the absolute values of said bias signals vary in correspondence with total energy, first resistor means coupled to the outputs of said preamplifiers, respectively, and second and third resistor means in circuit with said first resistor means to form voltage dividers, signals for producing said coordinate signals being obtainable from said voltage dividers, switching means respectively in circuit with said second and third resistor means, each of said switching means being responsive to the magnitude of the pulse signal from the preamplifier means exceeding the magnitude of the bias signal corresponding with the lower of said percentages and the magnitude of the bias signal corresponding with the lower of said percentages of peak value by changing state, respectively, to successively change the effective gain of said preamplifier means.

5. The system as in claim 4 wherein said switching means are transistor means having load circuits including said second and third resistor means, respectively, and each having a control terminal, and means for coupling said bias signals to said control terminals, respectively,.

6. The combination as in claim 4 wherein one of said bias signals is about 50% of the total signal peak value and another of said signals is about 70% of the total signal peak value.

7. In a radiation imaging system:

a plurality of detectors for detecting radiant energy emitted by a subject, each of said detectors producing an electric pulse in response to each detected radiation event, a plurality of preamplifier means for amplifying the electric pulses from the respective detector means, means for summing said electric pulses from said preamplifier means and for producing a signal representing the total energy of said pulses, means responding to said total energy signal by producing a bias signal corresponding with a predetermined percentage of said total energy signal so the absolute value of said bias signal varies in correspondence with total energy, and output circuit means for the electric pulses from said preamplifier means and including means controlled by said bias signals to change the gain effectively of said preamplifier means coincident with occurrence of any signal from said preamplifier means which has greater magnitude than a bias signal corresponding with said percentage of the peak of said total energy signal.

8. In a system comprising a plurality of detectors for detecting scintillation events resulting from radiation emitted from a subject, each detector producing an electric pulse having a magnitude dependent on its relationship with the event, means responsive to said signals by producing signals corresponding with the coordinates of said events and display means responsive to said coordinate signals by producing an image which is a composite of said events at corresponding coordinates, means for improving correspondence between the coordinates of the events and their coordinates in said display substantially independently of the energy of the radiation which caused the event comprising:

a plurality of channels each including preamplifier means having means and having input means coupled with the detectors, respectively, for amplifying their said electric pulses, means for summing all of said pulses from said output means and resulting from each event simultaneously with the event to produce a signal representing the total energy of the pulses, means responding to said total energy signal by producing a dc bias signal corresponding with a predetermined percentage of the peak value of said total energy signal so the absolute value of said bias signal varies in correspondence with total energy, first resistor means coupled to the outputs of said preamplifiers, respectively, and a circuit including a diode, a resistor means and an ac bias voltage source, said circuit being coupled with said dc bias signal source and with said first resistor means to form voltage dividers, signals for producing said coordinate signals being obtainable from said voltage dividers, whereby when said signals from said preamplifiers exceed the sum of said dc and ac bias voltages said circuit will conduct and effectively change the gain of said preamplifier means.

9. The system as in claim 8 wherein said dc bias voltage is about 50% of said total energy voltage signal value.

* * * * *